United States Patent
Mody et al.

(10) Patent No.: US 11,671,481 B2
(45) Date of Patent: Jun. 6, 2023

(54) OPERATIONS PRODUCTIVITY SOFTWARE SYSTEM, SERVER AND METHOD

(71) Applicant: AVEVA SOFTWARE, LLC, Lake Forest, CA (US)

(72) Inventors: Rashesh Mody, San Clemente, CA (US); John Krajewski, Lake Forest, CA (US); Abhijit Manushree, Laguna Niguel, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 0 days.

(21) Appl. No.: 17/849,558

(22) Filed: Jun. 24, 2022

(65) Prior Publication Data
US 2023/0048011 A1  Feb. 16, 2023

Related U.S. Application Data (60) Provisional application No. 63/214,646, filed on Jun. 21, 2021.

(51) Int. Cl.
*H04L 67/10* (2022.01)
*H04L 9/40* (2022.01)

(52) U.S. Cl.
CPC ............ *H04L 67/10* (2013.01); *H04L 63/10* (2013.01)

(58) Field of Classification Search
None
See application file for complete search history.

(56) References Cited

U.S. PATENT DOCUMENTS

| | | | | |
|---|---|---|---|---|
| 11,195,131 | B2* | 12/2021 | Mowatt | G06F 16/23 |
| 2012/0191507 | A1* | 7/2012 | Bramworth | G06Q 10/103 |
| | | | | 705/7.36 |
| 2012/0239699 | A1 | 9/2012 | Anand et al. | |
| 2014/0094159 | A1* | 4/2014 | Raleigh | H04W 24/02 |
| | | | | 455/418 |
| 2015/0054625 | A1 | 2/2015 | Blair et al. | |
| 2015/0363724 | A1 | 12/2015 | Chatterjee et al. | |
| 2016/0224615 | A1 | 8/2016 | Rehman et al. | |
| 2018/0197161 | A1* | 7/2018 | Kuzkin | G06Q 30/04 |

(Continued)

FOREIGN PATENT DOCUMENTS

WO    2011002777 A1    1/2011

OTHER PUBLICATIONS

International Search Report and Written Opinion in related International Application No. PCT/US2022/035021 dated Nov. 14, 2022, 14 pages.

*Primary Examiner* — Quang N Nguyen
(74) *Attorney, Agent, or Firm* — Greenberg Traurig, LLP

(57) ABSTRACT

Disclosed are systems, servers and methods for a multi-tenant framework that manages and controls operations of software as a service (SaaS) applications and services, and the data and metadata (e.g., files) created, updated and interacted with therefrom. The disclosed framework provides a centralized approach to managing the entitlement and provisioning of SaaS applications on client devices across a variety of channels on a network. The disclosed SaaS framework is configured for management, control, deployment and synchronization between devices, applications, systems and platforms both on-premises (on-prem or local devices/storage) and/or hosted on a network (e.g., a cloud platform, service or platform).

16 Claims, 6 Drawing Sheets

(56) References Cited

U.S. PATENT DOCUMENTS

| | | | | |
|---|---|---|---|---|
| 2018/0232404 A1* | 8/2018 | Bhatti | ............... | G06F 16/9024 |
| 2018/0232786 A1* | 8/2018 | Kuzkin | ............. | G06Q 20/0855 |
| 2019/0347585 A1* | 11/2019 | Mowatt | ............. | G06Q 10/0633 |

* cited by examiner

OPERATIONS PRODUCTIVITY SOFTWARE SYSTEM, SERVER AND METHOD

RELATED APPLICATION

This application claims the benefit of and priority to U.S. Provisional Application No. 63/214,646, filed Jun. 24, 2021, the entire contents of which are incorporated herein by reference.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

Some embodiments relate generally to improving the performance of network-based computerized application and content hosting and providing devices, systems and/or platforms by modifying the capabilities and providing non-native functionality to such devices, systems and/or platforms through a novel and improved multi-tenant framework for managing and controlling operations of software as a service (SaaS) applications and services, and the data and metadata (e.g., files) created, updated and interacted with therefrom.

BACKGROUND

SaaS refers to a software application delivery model where a software vendor develops a web-native software application and hosts and operates the application for use by its customers over the Internet. SaaS applications and/or services, also known as cloud-based software, involve methods for software delivery and functionality that allows data to be accessed from any device with an internet connection and a web browser. In such web-based modelling, software vendors host and maintain the servers, databases, and the code that makes up an application.

Traditional on-premise ("on-prem") software delivery models differ from SaaS in two key ways, inter alia. First, SaaS deployments do not require extensive hardware, which allows its users to outsource most of the computational responsibilities typically required to troubleshoot and maintain the software in-house. Secondly, SaaS systems can be paid within a subscription model, whereas on-premise software is usually purchased through a perpetual license, paid upfront and often limited to one or a few versions.

SUMMARY

In a multi-tenant SaaS architecture, an application is deployed and maintained centrally, while being administered and accessed remotely over Internet. The end users grouped as tenants, access features of the application and share the resources associated with the application. The access to the features of the application may be billed to the tenants on a subscription license model or 'pay-per-use' models.

Multi-tenant architecture results in many benefits to the SaaS provider and the tenants as well, with centralized control on management of service and upgrades. The multi-tenant architecture allows scaling from a single tenant to thousands of tenants by simply plugging more hardware into the system, changing few configurations, and without modifying the software resources. Further, the nature of the multi-tenant architecture makes it easier for the SaaS provider to deliver more efficient and effective service and support as only one platform needs to be monitored and managed. Furthermore, upgrading the software version gets easier as modifications and upgrading needs to be done at a single and centralized place.

There currently exists many frameworks for implementing multi-tenant architecture for an application. However, these frameworks suffer from numerous computational deficiencies realized through interactions by and between the SaaS provider and its tenants, as well as conventional availability of computerized solutions. Some of the critical lapses in computational functionality in conventional systems involves a lack of customization, large number of dependencies (e.g., resource drain), no extensibility support to meet current and expected requirements, lack of productivity tools, solutions provided for a problem in a given context becoming irrelevant in another context, and support for design-time and/or runtime integrations.

Such deficiencies can result in increased implementation or adoption time for the multi-tenant architecture. This in turn increases the time, computational resources attributed to non-functional elements of the system, and the costs to bring the SaaS based multi-tenant web application to the market, and therefore decreasing its Returns on Investments (ROI) as well as increasing its overhead costs for maintaining the application.

The disclosed systems and methods address these shortcomings, among others, and provide a novel framework that provides a centralized approach to managing the entitlement and provisioning of SaaS applications on client devices across a variety of channels on a network as software development continuously shifts away from traditional applications to more virtualized, remote, SaaS applications.

For purposes of this disclosure, reference will generally be made to files that are created and uploaded by users, and files and tools related to applications, programs and devices, and include both data and metadata related to electronic information contained in the electronic (or digital) files. One of ordinary skill in the art would understand that such files and take any form, whether known or to be known, such as, but not limited to, electronic documents, images, text, audio, video, multi-media, software kits, scripts, program files, graphics, electronic messages, exchange files, CAD (computer-aided design) files (e.g., STEP/IFC (Standard for Exchange of Product Model Data/Industrial Foundation Classes) files, steel detail neutral files (SDNF) files, and the like), tag lists, and the like, or some combination thereof. One of ordinary skill in the art would also understand that such files can include, but are not limited to, including any type of known or to be known electronic content, including, but not limited to, images, text, graphics, multi-media, material files, drawings, geometrical exports, exchange data, SaaS data, PaaS (platform-as-a-service) data, IaaS (infrastructure-as-a-service) data, file-transfer-protocol (FTP) data, and the like, or some combination thereof.

Some embodiments provide a novel framework that is configured for management, control, deployment and synchronization between devices, applications, systems and platforms both on-premises (on-prem or local devices/storage) and/or hosted on a network (e.g., a cloud platform, service or platform). In some embodiments, the disclosed systems and methods embodied and executed through the disclosed framework can be configured to replicate data between locations, which can include local and/or networked locations, such as on-premises sites and the Cloud.

For purposes of this disclosure, locations may be referred to as "tenants" and/or "endpoints", such that an endpoint can refer to devices, applications, locations, or some combination thereof, for example, that accesses data with another endpoint or a server. For example, one endpoint may be a user's smart phone at a jobsite, while another endpoint can be the central server for a manufacturing plant. As will be discussed in detail herein, in some embodiments, the data from these endpoints can be shared and synchronized from endpoint to endpoint.

In some embodiments, the disclosed framework is configured for executing and providing systems and methods that provide capabilities for: on-prem sync to the cloud, vice-versa, on-prem to on-prem, and cloud to cloud, and the like; enable ubiquitous access to the cloud from both on-prem and network devices; enable the sharing and access of data across locations, devices, networks, and users, and the like. Some embodiments also enable third party and native applications access to the cloud framework for accessing, uploading and synchronizing their data (e.g., read and write privileges) within the cloud and across endpoints.

Some embodiments are configured for both internal (e.g., AVEVA® products and services) and external services to access, store and retrieve data from the proprietary SaaS infrastructure disclosed herein. Some embodiments enable file sharing between location to location, cloud to cloud, device to device, device to cloud, cloud to device, network to network, and the like. Some embodiments also enable versioning, as discussed in more detail below, such that all changes to the shared files and/or cloud service accessed by all parties/entities are properly and timely dispersed to each user, device, platform or service.

In some embodiments, the SaaS infrastructure can be configured according to any known or to be known cloud or database management architecture, infrastructure or management configuration, including, but not limited to, Blockchain, binary large object (BLOB) storage, files storage, or any other type of cloud database management system architecture, as understood by those of skill in the art. In some embodiments, such infrastructure can enable navigation of types of data related to types of services, products and/or hosting entities while providing security protocols (e.g., AVEVA® SDK) that control whether navigation to such type of data is accessible.

According to some embodiments, the storage provided by the disclosed framework can be configured to provide a scaled amount of storage per account, per location or per usage. The scaled amount can be set and can dictate how much data can be stored. In some embodiments, the scaled amount can be dynamically adjusted based on usage, and the integrity of such usage or access by the users of the account.

Some embodiments provide a method for managing and controlling operations of SaaS applications and services, and the data and metadata (e.g., files) created, updated and interacted with therefrom.

Some embodiments provide a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., a server(s)) cause at least one processor to perform a method for managing and controlling operations of SaaS applications and services, and the data and metadata (e.g., files) created, updated and interacted with therefrom, as discussed herein.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with some embodiments, program code (or program logic) executed by a processor(s) of a computing device to implement functionality in accordance with one or more such embodiments is embodied in, by and/or on a non-transitory computer-readable medium.

DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Figure 1:
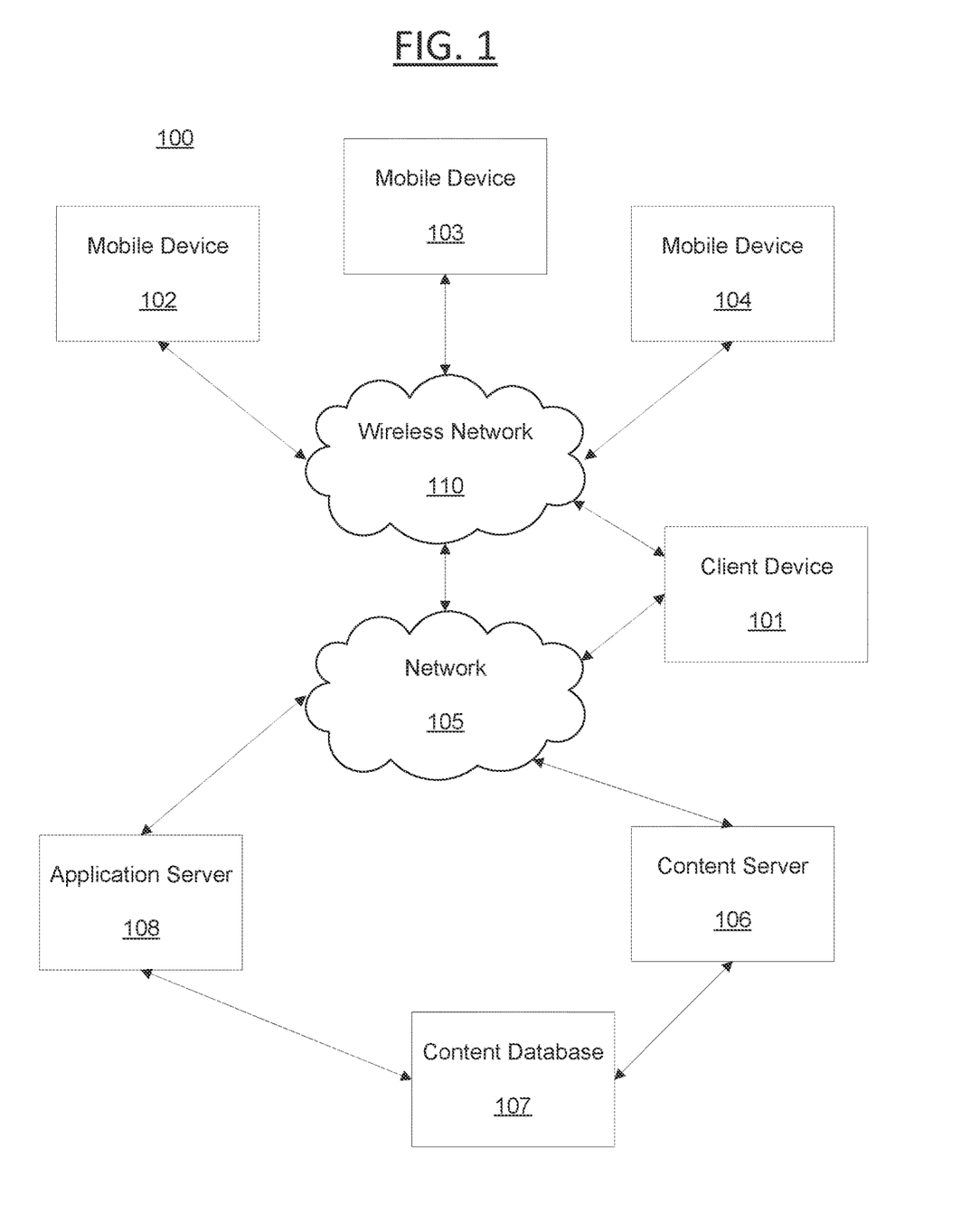
FIG. 1 is a schematic diagram illustrating an example of a network within which the systems and methods disclosed herein could be implemented according to some embodiments of the present disclosure.

Certain embodiments will now be described in greater detail with reference to the figures. In general, with reference to FIG. 1, a system 100 in accordance with some embodiments of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106 and application (or "App") server 108.

Some embodiments of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In some embodiments, such communications may include sending and/or receiving messages, creating and uploading documents, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

In some embodiments, wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

In some embodiments, network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

In some embodiments, the content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. In some embodiments, content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example the email services and email platform, can be provided via the message server 120.

In some embodiments, users are able to access services provided by servers 106 and 108. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, application server 108, for example, can store various types of applications and application related information including application data and user profile information (e.g., identifying, generated and/or observed information associated with a user).

In some embodiments, content server 106 and app server 108 can store various types of data related to the content and services each provide, observe, identify, determine, generate, modify, retrieve and/or collect. Such data can be stored in an associated content database 107, as discussed in more detail below.

In some embodiments, server 106 and/or 108 can be embodied as a cloud server or configured for hosting cloud services, as discussed herein.

In some embodiments, the network 105 is also coupled with/connected to a Trusted Search Server (TSS) which can be utilized to render content in accordance with the embodiments discussed herein. Embodiments exist where the TSS functionality can be embodied within servers 106 and 108.

Moreover, although FIG. 1 illustrates servers 106 and 108 as single computing devices, respectively, the disclosure is not so limited. For example, one or more functions of servers 106 and 108 may be distributed across one or more distinct computing devices. Moreover, in some embodiments, servers 106 and 108 may be integrated into a single computing device, without departing from the scope of the present disclosure.

Additionally, while the illustrated embodiment in FIG. 1 depicts only servers 106 and 108, it should not be construed as limiting, as any type and number of servers can be included therein.

Figure 2:
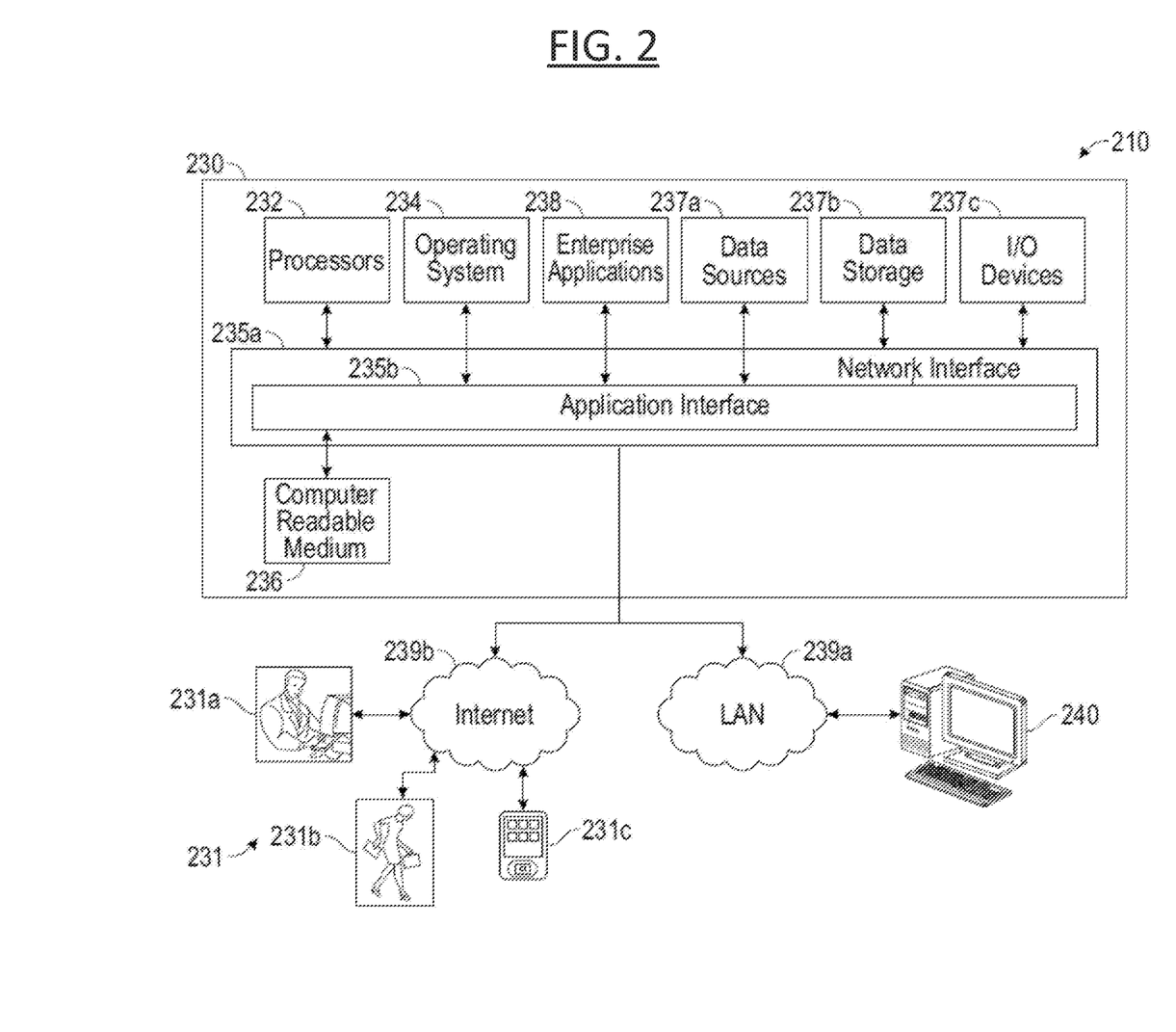
FIG. 2 is a schematic diagram illustrating an example of a network within which the systems and methods disclosed herein could be implemented according to some embodiments of the present disclosure.

Turning to FIG. 2, computer system 210 is depicted and is a non-limiting example embodiment of system 100 discussed above in relation to FIG. 1.

FIG. 2 illustrates a computer system 210 enabling or operating an embodiment of system 100 of FIG. 1, as discussed below (see also FIG. 5, discussed below). In some embodiments, computer system 210 can include and/or operate and/or process computer-executable code of one or more of the above-mentioned program logic, software modules, and/or systems. Further, in some embodiments, the computer system 210 can operate and/or display information within one or more graphical user interfaces. In some embodiments, the computer system 210 can comprise a cloud server and/or can be coupled to one or more cloud-based server systems.

In some embodiments, the system 210 can comprise at least one computing device 230 including at least one processor 232. In some embodiments, the at least one processor 232 can include a processor residing in, or coupled to, one or more server platforms. In some embodiments, the system 210 can include a network interface 235a and an application interface 235b coupled to the least one processor 232 capable of processing at least one operating system 234. Further, in some embodiments, the interfaces 235a, 235b coupled to at least one processor 232 can be configured to process one or more of the software modules 238 (e.g., such as enterprise applications). In some embodiments, the software modules 238 can include server-based software, and can operate to host at least one user account and/or at least one client account, and operating to transfer data between one or more of these accounts using the at least one processor 232.

With the above embodiments in mind, it should be understood that some embodiments can employ various computer-implemented operations involving data stored in computer systems. Moreover, the above-described databases and models described throughout can store analytical models and other data on computer-readable storage media within the system 210 and on computer-readable storage media coupled to the system 210. In addition, the above-described applications of the system can be stored on non-transitory computer-readable storage media within the system 210 and on computer-readable storage media coupled to the system 210.

In some embodiments, the system 210 can comprise at least one non-transitory computer readable medium 236 coupled to at least one data source 237a, and/or at least one data storage device 237b, and/or at least one input/output device 237c. In some embodiments, the disclosed systems and methods can be embodied as computer readable code on a computer readable medium 236. In some embodiments, the computer readable medium 236 can be any data storage device that can store data, which can thereafter be read by a computer system (such as the system 210). In some embodiments, the computer readable medium 236 can be any physical or material medium that can be used to tangibly store the desired information or data or instructions and which can be accessed by a computer or processor 232. In some embodiments, at least one of the software modules 238 can be configured within the system to output data to at least one user 231 via at least one graphical user interface rendered on at least one digital display.

In some embodiments, the non-transitory computer readable medium 236 can be distributed over a conventional computer network via the network interface 235a where the system embodied by the computer readable code can be stored and executed in a distributed fashion. For example, in some embodiments, one or more components of the system 210 can be coupled to send and/or receive data through a local area network ("LAN") 239a and/or an internet coupled network 239b (e.g., such as a wireless internet). In some further embodiments, the networks 239a, 239b can include wide area networks ("WAN"), direct connections (e.g., through a universal serial bus port), or other forms of computer-readable media 236, or any combination thereof.

In some embodiments, components of the networks 239a, 239b can include any number of user devices such as personal computers including for example desktop computers, and/or laptop computers, or any fixed, generally non-mobile internet appliances coupled through the LAN 239a. For example, some embodiments include personal computers 240a coupled through the LAN 239a that can be configured for any type of user including an administrator. Other embodiments can include personal computers coupled through network 239b. In some further embodiments, one or more components of the system 210 can be coupled to send or receive data through an internet network (e.g., such as network 239b). For example, some embodiments include at least one user 231 coupled wirelessly and accessing one or more software modules of the system including at least one enterprise application 238 via an input and output ("I/O") device 237c. In some other embodiments, the system 210 can enable at least one user 231 to be coupled to access enterprise applications 238 via an I/O device 237c through LAN 239a. In some embodiments, the user 231 can comprise a user 231a coupled to the system 210 using a desktop computer, and/or laptop computers, or any fixed, generally non-mobile internet appliances coupled through the internet 239b. In some embodiments, the user 231 can comprise a mobile user 231b coupled to the system 210. In some embodiments, the user 231b can use any mobile computing device 231c to wirelessly coupled to the system 210, including, but not limited to, personal digital assistants, and/or cellular phones, mobile phones, or smart phones, and/or pagers, and/or digital tablets, and/or fixed or mobile internet appliances.

Figure 3:
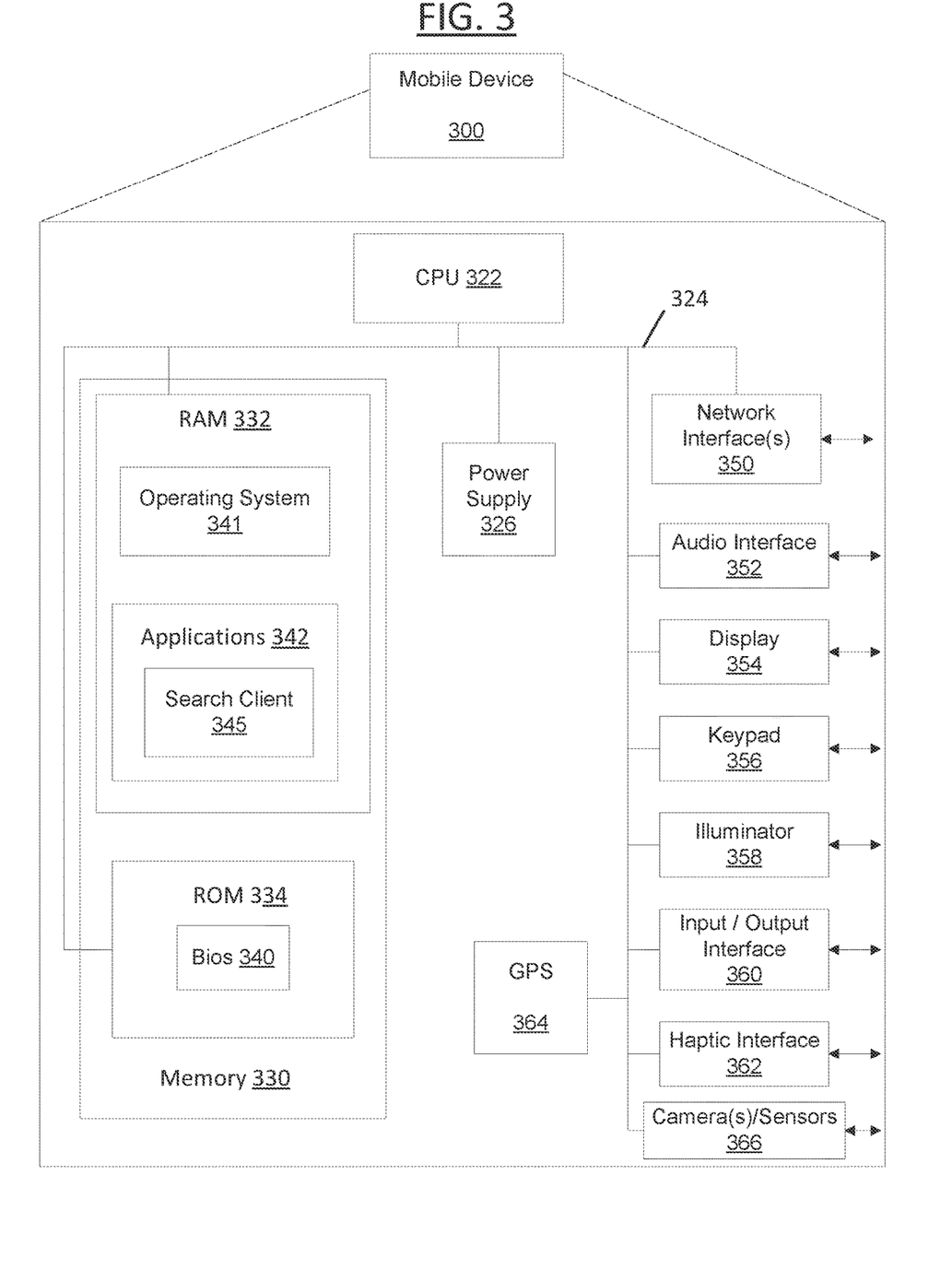
FIG. 3 depicts is a schematic diagram illustrating an example of client device according to some embodiments of the present disclosure.

FIG. 3 is a schematic diagram illustrating a client device showing an example embodiment of a client device that may be used within the present disclosure. Client device 300 may include many more or fewer components than those shown in FIG. 3. However, the components shown are sufficient to disclose an illustrative embodiment for implementing the present disclosure. Client device 300 may represent, for example, client devices discussed above in relation to FIGS. 1-2.

As shown in FIG. 3, in some embodiments, client device 300 includes a processing unit (CPU) 322 in communication with a mass memory 330 via a bus 324. In some embodiments, client device 300 also includes a power supply 326, one or more network interfaces 350, an audio interface 352, a display 354, a keypad 356, an illuminator 358, an input/output interface 360, a haptic interface 362, an optional global positioning systems (GPS) receiver 364 and a camera(s) or other optical, thermal or electromagnetic sensors 366. Device 300 can include one camera/sensor 366, or a plurality of cameras/sensors 366, as understood by those of skill in the art. Power supply 326 provides power to the client device 300.

Client device 300 may optionally communicate with a conventional base station (not shown), or directly with another computing device. Network interface 350 is sometimes known as a transceiver, transceiving device, or network interface card (NIC).

In some embodiments, audio interface 352 is arranged to produce and receive audio signals such as the sound of a human voice. Display 354 may be a liquid crystal display (LCD), gas plasma, light emitting diode (LED), or any other type of display used with a computing device. Display 354 may also include a touch sensitive screen arranged to receive input from an object such as a stylus or a digit from a human hand.

Keypad 356 may comprise any input device arranged to receive input from a user. Illuminator 358 may provide a status indication and/or provide light.

In some embodiments, client device 300 also comprises input/output interface 360 for communicating with external. Input/output interface 360 can utilize one or more communication technologies, such as USB, infrared, Bluetooth™, or the like. In some embodiments, haptic interface 362 is arranged to provide tactile feedback to a user of the client device.

Optional GPS transceiver 364 can determine the physical coordinates of client device 300 on the surface of the Earth, which typically outputs a location as latitude and longitude values. GPS transceiver 364 can also employ other geo-positioning mechanisms, including, but not limited to, tri-angulation, assisted GPS (AGPS), E-OTD, CI, SAI, ETA, BSS or the like, to further determine the physical location of Client device 300 on the surface of the Earth. In some embodiments, however, the client device 300 may through other components, provide other information that may be employed to determine a physical location of the device, including for example, a MAC address, Internet Protocol (IP) address, or the like.

In some embodiments, mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 340 for controlling low-level operation of client device 300. The mass memory also stores an operating system 341 for controlling the operation of client device 300.

In some embodiments, memory 330 further includes one or more data stores, which can be utilized by client device 300 to store, among other things, applications 342 and/or other information or data. For example, data stores may be employed to store information that describes various capabilities of client device 300. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within client device 300.

In some embodiments, applications 342 may include computer executable instructions which, when executed by client device 300, transmit, receive, and/or otherwise process audio, video, images, and enable telecommunication with a server and/or another user of another client device. In some embodiments, applications 342 may further include search client 345 that is configured to send, to receive, and/or to otherwise process a search query and/or search result.

Having described the components of the general architecture employed within some embodiments, the components' general operation with respect to some embodiments will now be described below.

Figure 4:
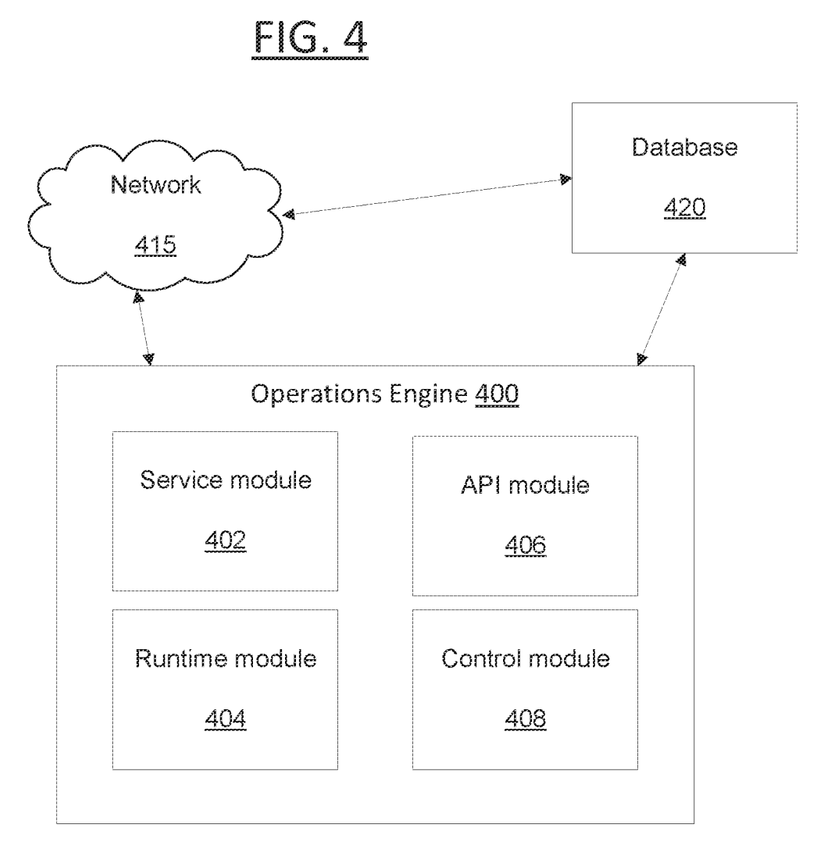
FIG. 4 is a block diagram illustrating components of an exemplary system according to some embodiments of the present disclosure.

FIG. 4 is a block diagram illustrating the components of some embodiments. FIG. 4 includes operations engine 400, network 415 and database 420. The user interface (UI) engine 400 can be a special purpose machine or processor and could be hosted by a cloud server (e.g., cloud web services server(s)), application server, content server, web server, search server, content provider, third party server, user's computing device, and the like, or any combination thereof.

According to some embodiments, operations engine 400 can be embodied as a stand-alone application that executes on a server and/or user device (e.g., on a cloud server and/or on-prem on a user device or local storage). In some embodiments, the operations engine 400 can function as an application installed on a device; and, in some embodiments, such application can be a multi-tenant, SaaS web-based application accessed by a device(s) over a network. In some embodiments, engine 400 comprises functionality for integration with a private data center, a Platform-as-a-Service (PaaS), and an Infrastructure-as-a-Service (IaaS), and the like.

The database 420 can be any type of database or memory and can be associated with a content server on a network (e.g., cloud server, content server, a search server or application server) or a user's device (e.g., client devices discussed above in FIGS. 1-3). Database 420 comprises a dataset of data and metadata associated with local and/or network information related to users, services, applications, content and the like. Such information can be stored and indexed in the database 420 independently and/or as a linked or associated dataset. As discussed above, it should be understood that the data (and metadata) in the database 420 can be any type of information and type, whether known or to be known, without departing from the scope of the present disclosure.

According to some embodiments, database 420 can store data and metadata associated with users, applications, programs, versions, operations, tasks, assets, files, projects, versions, synchronization events, schedules, images, videos, text, messages, products, items and services from an assortment of media and/or service providers and/or platforms, and the like. It should be understood that the data (and metadata) in the database 420 can be any type of information related to a user, asset, location, job, operation, content, a device, an application, a service provider, a content provider, whether known or to be known, without departing from the scope of the present disclosure.

As discussed above, with reference to FIGS. 1-2, the network 415 can be any type of network such as, but not limited to, a wireless network, a local area network (LAN), wide area network (WAN), the Internet, or a combination thereof. The network 415 facilitates connectivity of the operations engine 400, and the database of stored resources 420. Indeed, as illustrated in FIG. 4, the operations engine 400 and database 420 can be directly connected by any known or to be known method of connecting and/or enabling communication between such devices and resources.

The principal processor, server, or combination of devices that comprises hardware programmed in accordance with the special purpose functions herein is referred to for convenience as operations engine 400, and includes service module 402, runtime module 404, application program interface (API) module 406 and control module 408.

According to some embodiments, service module 402 can be configured to configured to facilitate implementation of multi-tenant architecture. In some embodiments, service module 402 can facilitate development of new applications that can be deployed and managed over network 415. In some embodiments, service module 402 can facilitate development of a customized SaaS based multi-tenant web application supporting multi-tenant architecture. In some embodiments, service module 402 can facilitate implementation of multi-tenant architecture for a non-SaaS based web application.

In some embodiments, service module 402 can facilitate implementation of a multi-tenant architecture in which a SaaS entity may run a single instance of a software application on a server associated with the SaaS entity. In some embodiments, a single instance of the software application may serve each customer or tenant of a plurality of tenants. In some embodiments, a single instance of the software application may provide a unique user experience and feature set for each tenant. In some embodiments, authorization and security policies provided by service module 402 can ensure that each tenant's data is kept separate from that of other tenants. In some embodiments, service module 402 may facilitate implementation of a multi-tenant architecture in which the SaaS vendor may host multiple tenants on a server farm of identical software instances with each tenant's data maintained separately. In some embodiments, identical software instances may provide a unique user experience and feature set for each tenant.

In some embodiments, runtime module 404 can be configured to integrate with service module 402 and API module 406 in order to control the execution operations, file and/or data/metadata provided by engine 400. In some embodiments, modules 404 and 406 can operate as a unified API.

In some embodiments, runtime module 404 can be further configured to provide services including, but not limited to, an application management service, a subscription management service, a package management service, a type customization service, a privilege management service, a user management service, a rule management service, a resource management service, and a profile management service, and the like, and/or some combination thereof.

In some embodiments, API module 406 can be configured to provide a plurality of APIs for executing different functionalities of engine 400. In some embodiments, APIs may be categorized as APIs on the client side and/or on the service side. In some embodiments, client-side APIs, in association with runtime module 404, can provide access to the client side services. In some embodiments, server-side APIs, in association with service module 402, can provide access to server-provided services over a network, such as, but not limited to, application and/or file and pricing management, distribution and synchronization. The service-side APIs can be configured to facilitate access to software components and/or runtime files for execution over a network or via client-side operations.

In some embodiments, control module 408 can be configured for performing operations related to granting access, controlling privileges, initiating synchronization events, launching applications, effectuating installations, providing updates, and the like, or some combination thereof. Control module 408 can dictate different application and/or file deployment options, based on device and/or network configuration and capabilities, as well as subscription details for each device and/or service package.

It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 5:
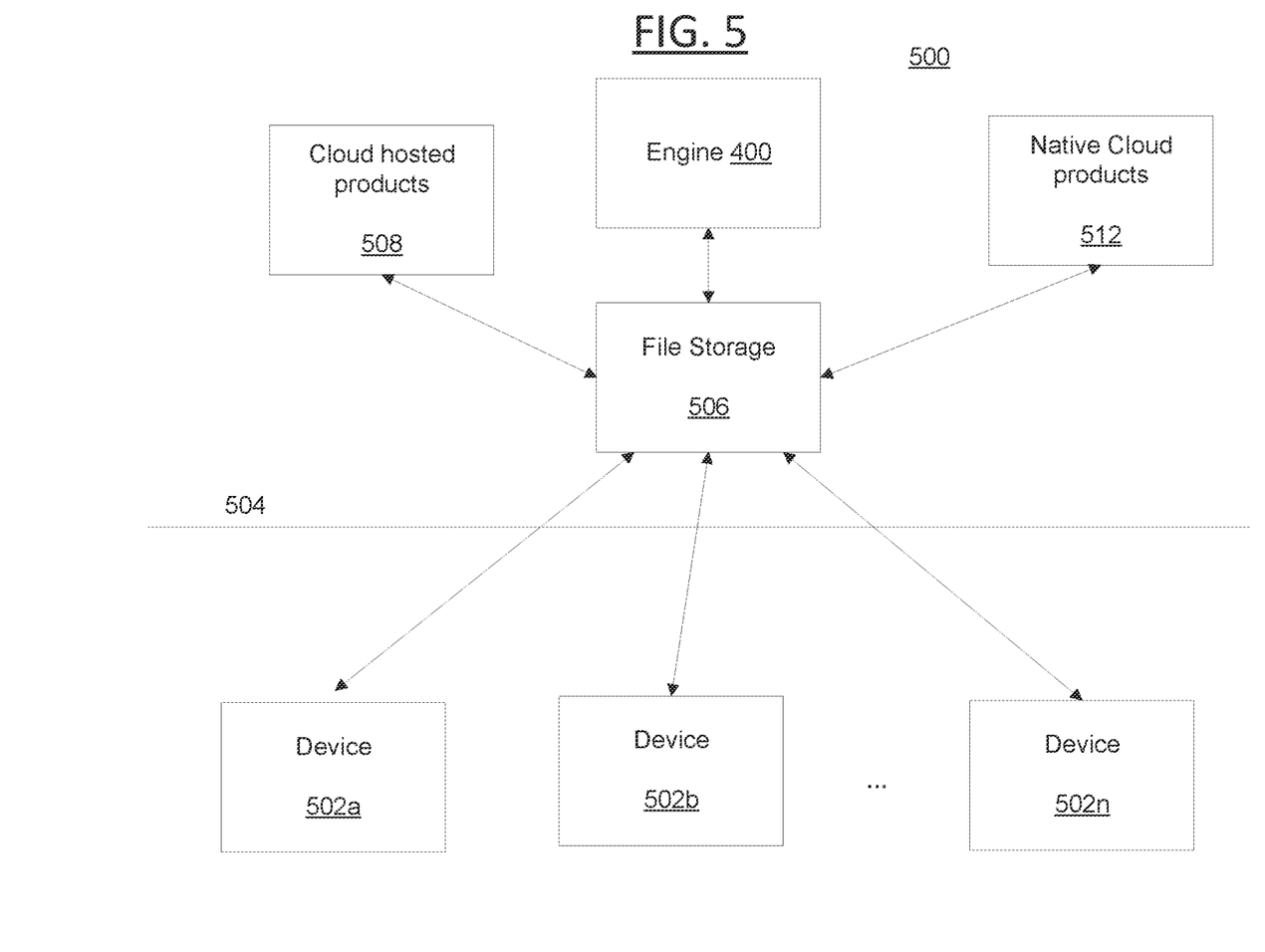
FIG. 5 illustrates a non-limiting embodiment of network architecture and configuration according to some embodiments of the present disclosure.

Turning to FIG. 5, system 500 provides a non-limiting embodiment of network architecture and configuration according to some embodiments. System 500 provides a non-limiting example of interactions between devices at devices 502*a*-502*n*, which for purposes of this example, are networked devices at endpoints, and the cloud storage provided as file storage 506.

In some embodiments as discussed herein, storage 506 an be configured as a multi-tenant database that can perform synchronization action between multiple devices that includes reconciling the current state of the list of data objects with corresponding data objects in the multi-tenant database without further (i.e., independent of) user action. In some embodiments, storage 506 can host and/or execute engine 400 which can be configured to control application sessions, monitor files and directories in the subset of the multi-tenant database and in computing devices associated with devices 502*a*-502*n*, and to reconcile updated files in real time.

As discussed herein, storage 506, cloud hosted products 508, engine 400 and native cloud products 512 are hosted on a network (e.g., the Internet), whereas devices associated with devices 502*a*-502*n* can be local devices that connect with the network to access file storage 506 and its associated elements 508 and 512, and the like. Thus, line 504 provides an indication of a network connection that is required to connect to the cloud within system 500 (e.g., devices 502*a*-502*n* connect via a network(s) to storage 506).

According to some embodiments, the configuration of system 500 enables engine 400 to provide SaaS capabilities of cloud hosted products 508 and native cloud products 512, via storage 506, over network 504 to devices 502*a*-502*n*.

In some embodiments, devices 502*a*-502*n* can refer to devices at the same location (e.g., the same plant), all or a portion of which have access to the drive of data within file storage 506. In some embodiments, devices 502*a*-502*n* can refer to devices at different locations (e.g., different facilities and/or third party facilities with no affiliation), all with different degrees of access privileges, as discussed above.

In some embodiments, the integration of the file storage 506 between each user (e.g., devices 502*a*-502*n*) and the products 508, 512 provides functionality that enables the file storage 506 (via engine 400, as discussed below) to control how, when and to what degree applications and/or files can be accessed, installed, downloaded, shared, edited and/or even visible to requesting users, services, platforms or locations, and the like.

In some embodiments, a device (502*a*-502*n*) can be associated with another service, platform or cloud service, for example. Thus, rather than only users (and their associated devices) being able to access the storage 506, other types of services, cloud servers and platforms can access the file storage 506.

System 500's configuration and infrastructure of storage 506, therefore, in some embodiments, supports any known or to be known network configuration and/or network connection management protocol where any type, quantity and/or frequency of devices, users, servers, platforms or services can access and utilize a drive(s) to host data for SaaS, PaaS, IaaS, and the data synchronization between multiple locations (whether real-world or digital locations), that can occur therein.

According to some embodiments, as depicted in FIG. 5, file storage 506 is associated with native cloud products 512. In some embodiments, the native cloud products 512 can be directly connected or associated with storage 506 (e.g., stored within a component or drive of storage 506); and, in some embodiments, native cloud products 512 can be stored in a separate data store or server, and accessible via a network by storage 506.

In some embodiments, native cloud products 512 can include, without limitation, APIs, agile methodologies, microservices, cloud platforms, containers, security features, tools, and any other type of known or to be known application development or deployment by a hosting party of storage 506. In some embodiments, native cloud products 512 enables storage 506 to provide, for example, SaaS and/or PaaS functionality to devices 502*a*-502*n*.

Accordingly, in some embodiments, each location 502-502*n* can access the native cloud products 512 via the network hosted storage 506. This enables each location access to the same products at a cost saving configuration, such that they can be web-enabled, downloadable from a central location on a network, and available to all permitted users, services and/or platforms executing at each location 502a-502n. In some embodiments, this eliminates the computationally draining and network bandwidth clogging need to export/import or manually upload cycles of native cloud products 512 and/or files associated therewith.

In some embodiments, native cloud products 512 can be configured to access data stored in storage 506 via storage 506's API(s) (e.g., via API module 406 of engine 400), which enables access to data uploaded from devices 502a-502n, shared from cloud hosted products 508, and/or enables transferring data back to devices 502a-502n.

According to some embodiments, as depicted in FIG. 5, file storage 506 is associated with engine 400. In some embodiments, the engine 400 can be directly connected or associated with storage 506 (e.g., stored within a component or drive of storage 506); in some embodiments, engine 400 can be stored in a separate data store or server, and accessible via a network by storage 506.

In some embodiments, engine 400 can provide a service or services that are part of an object management group (OMG) that provides, via various types of APIs, a set of maintained standards that facilitates and/or controls cross-platform processes. Such functionality is discussed above in relation to the modules 402-408 of engine 400.

According to some embodiments, as depicted in FIG. 5, file storage 506 is associated with cloud hosted products 508. In some embodiments, the cloud hosted products 508 can be directly connected or associated with storage 506 (e.g., stored within a component or drive of storage 506); in some embodiments, cloud hosted products 508 can be stored in a separate data store or server, and accessible via a network by storage 506.

In some embodiments, cloud hosted products 508 can refer to applications, software, software kits, APIs, and the like, that have access to data stored within a drive(s) within storage 506 that was uploaded from location 502a-502n and/or shared from native cloud products 512 or engine 400. Products 508 can be sandboxed and configured to seamlessly transfer data to devices 502a-502n (e.g., to users on-prem, remotely located, and vice-versa, and the like).

In some embodiments, file-based cloud hosted products 508 can access storage 506 according to access protocols associated with accessing a local or networked harddrive. In some embodiments, non-file-based products can use the storage 506's API(s) to access the data stored therein.

In some embodiments, storage 506 can be configured to integrate, interact with or otherwise communicate with and transfer data between third party cloud storage vendors and/or external access services provided by third party suppliers (e.g., email, FTP, and the like). In some embodiments, these third party services and/or vendors can access storage either via a networked connection or through a direct connection (e.g., either side of line 504). In some embodiments, access can be facilitated to such vendors and/or third party services via API's of engine 400 (e.g., API module 406) which enable devices 502a-502n to access and utilize the services data provided therein, and store the usage data in the associated drive in storage 506.

As discussed in more detail below in relation to FIG. 6, in some embodiments, system 500's configuration enables engine 400 to provide a service that provides and replicates application data to devices 502a-502n, where the application data can be provided from and/or associated with products 508 and/or 512. Storage 506 houses the application program files for products 508, 512 (e.g., tools, scripts, kits, program files, and the like), and the SaaS functionality of engine 400 enables devices 502a-502n to access, interact and/or execute such applications in a remote manner.

As discussed below in relation to FIG. 6, system 500's configuration, for example, enables engine to engage with customers to discern their needs, facilitate evaluation, justification and selection of software/services (e.g., via a subscription), facilitate access and implementation of the software/service products, and throughout the lifecycle of the provided solutions, assist in automatically patching, upgrading, monitoring and maintaining the viability, efficiency and accuracy of the provided software/service solutions. Moreover, engine 400 can continually monitor consumer data as well as application usage to ensure that the full value of the subscription is being utilized, and adjusting the breadth of the provided services accordingly.

Figure 6:
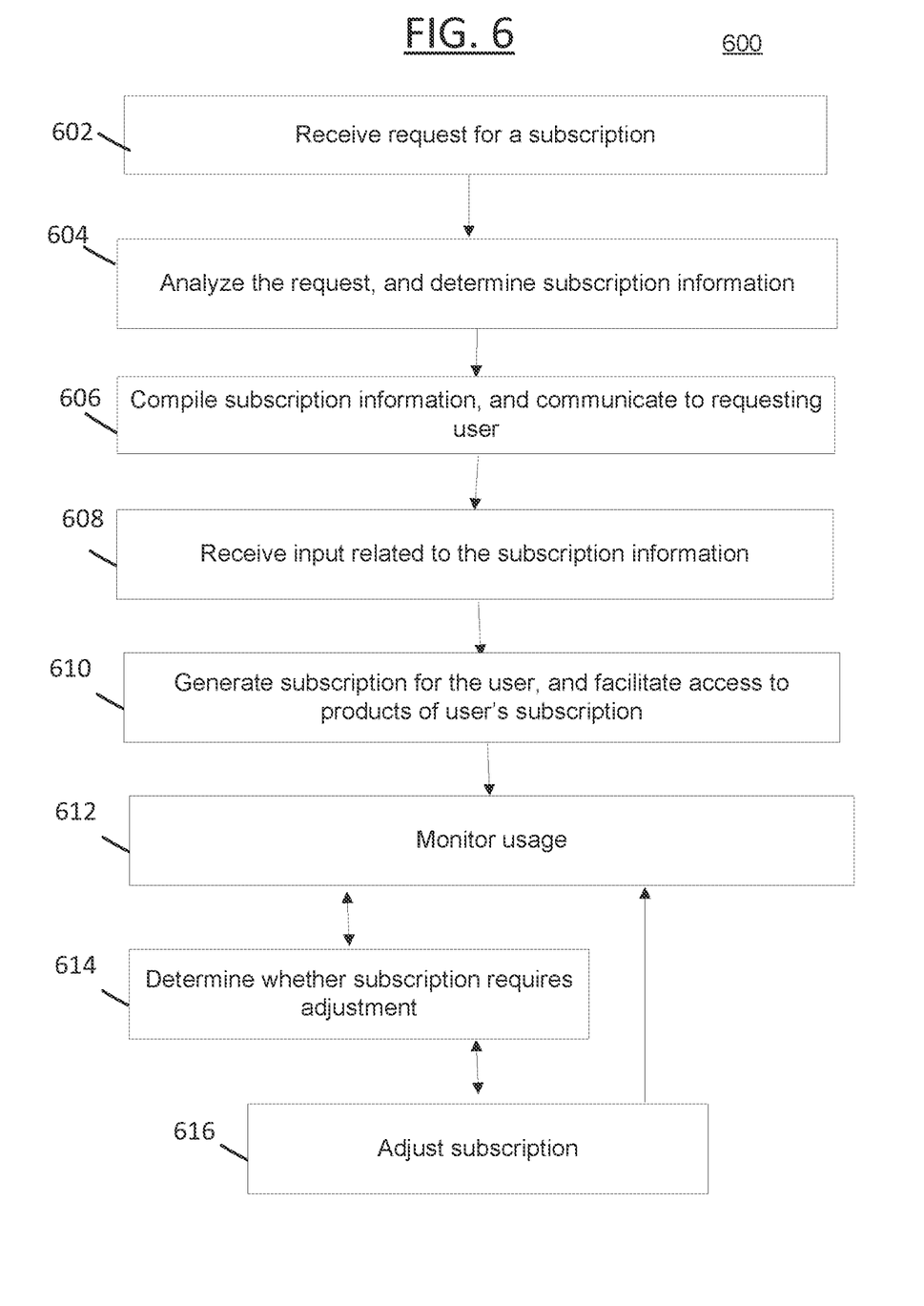
FIG. 6 is a flowchart detailing a non-limiting example embodiment according to some embodiments of the present disclosure.

Turning to FIG. 6, Process 600 provides a non-limiting data flow of the methodology of providing applications to devices 502a-502n. According to some embodiments, Process 600 provides a methodology for automatically providing, monitoring, maintaining and synchronizing data objects within a cloud-based and/or cloud-hosted computing environment. In some embodiments, the cloud infrastructure (as illustrated, for example, in FIGS. 1, 2 and 5), can include, but is not limited to, a server, a multi-tenant database, and computing devices connected to the multi-tenant database through a network.

In some embodiments, Process 600 includes running an application (engine 400) on a server through which applications, files and/or application object files are provided to and monitored from operations performed by the devices 502a-502n. In some embodiments, engine 400 can be executed at the network level in order to off-load the resources at each location, whereby application, monitoring and/or synchronization events may be effectuated by requests and/or pings from a server which cause each device to act (e.g., respond). In some embodiments, each location 502a-502n and the storage 506 (and/or its components) can execute an instance of engine 400 in order to effectuate the disclosed synchronization discussed herein.

In some embodiments, running the application (of engine 400) comprises, but is not limited to, monitoring application/file creation, application/file deletion, application/file revision of applications/files at devices 502a-502n and/or within storage 506 (e.g., the multi-tenant database). Such monitoring enables version control such that all users are viewing and interacting with the most current versions, which can be effectuated through the continuous, bi-directional synchronization functionality discussed herein.

In some embodiments, the synchronization between devices 502a-502n and storage 506 (and storage 506's connected devices/services 508-510, and third party entities services and platforms) can be effectuated via engine 400 being configured to maintain persistent connectivity with storage 506's API(s).

According to some embodiments, as discussed herein, Process 600 provides a non-limiting example embodiment where engine 400 enables the management and control of core operations, operations and maintenance and support and planning. In some embodiments, core operations can refer to, but are not limited to, operations of control and execution, facilities management, breakdown management and emergency responses, and the like. In some embodiments, operations and maintenance operations can refer to, but are not limited to, filed operations, routine maintenance, inventory monitoring, production execution, maintenance planning, forecasting and workforce collaboration, and the like. In some embodiments, support and planning operations can include, but are not limited to, field development plans and processes, compliance, testing, breakdown planning, long term production planning, maintenance and material plans, contracting and procurement, engineering plans, safety, and training and development, and the like.

For purposes of the discussion of Process 600, a user will be the subscribing entity. It should be understood that the user can be an individual, a company (with employees), a group of users, and the like, or some combination thereof.

Process 600 begins with Step 602 where a subscription request is received. In some embodiments, the subscription request can include information related to the user, the user's needs, the types of programs, files and/or functionality desired, and the like. In some embodiments, request can provide user data that can be analyzed so that a subscription can be tailored to the user's needs.

In some embodiments, the user data included in the subscription request can include, buts is not limited to, user identity, type of user, business objective, quantity of employees (e.g., sub-users), contract length, industry type, and the like. As discussed below, this information can be leveraged to determine a type and quantity of programs eligible and required for the user to operate their business operations.

In Step 604, the request from Step 602 is analyzed, and as a result of such analysis, a determination is made regarding subscription information, which can include, but is not limited to, a cost, term and/or type of programs and permissions related to eligible programs for the requesting user.

In some embodiments, where the request outlines a specific type of need and/or functionality, or a specific program(s), Step 604 can involve engine 400 analyzing the products information for products 508, 512 stored in storage 506, and identifying the corresponding program files for the user.

In some embodiments, the request can be analyzed based on the information included therein, where it can be automatically determined the type, term and availability of products for a user. In some embodiments, such analysis can involve engine 400 executing any type of known or to be known computational analysis technique on the request and the data included therein and/or associated therewith, including but not limited to, vector analysis, data mining, computer vision, machine learning, neural network, artificial intelligence, and the like, or some combination thereof.

In Step 606, the subscription information determined from Step 604 is compiled into a response, and is communicated to the requesting user. In some embodiment, the subscription information here can include, but is not limited to, a type of programs, quantity of programs, read/write rights for the programs, term of use, cost per use, cost per term, and the like, or some combination thereof. In some embodiments, the subscription information can also include alternative programs that can have higher or lower pricepoints, and varying functionality.

In some embodiments, such communication can involve generating an email, SMS or other type of electronic notification message so that the user can interact with the specifically described subscription information. In some embodiments, the subscription information can be displayed on a webpage that is accessible by the user (e.g., via a username or password, or other verifiable identifier (e.g., PIN or biometric).

In some embodiments, Step 606 can involve pre-loading program files for the identified programs in the subscription information in a cache or temporary storage of the server/device executing engine 400. This will enable faster loading and/or facilitation of the software services that are later selected by the user (as in Step 608 below).

In Step 608, input is received related to the compiled and presented subscription. Some embodiments can involve the user accepting the subscription. Some embodiments can involve the user modifying the subscription by adding, removing or altering the program types, versions and/or quantities provided in Step 606.

In Step 610, in response to the input from Step 608, a subscription for the user is established and initiated. The subscription is for the agreed upon term (from Step 608). In some embodiments, generation of the subscription enables identification of the program files for the selected products. Some embodiments involve facilitating access to such files, which can involve sending an account and/or device(s) of the user links to access the remotely stored program files. In some embodiments, the functionality for accessing, downloading and executing the programs is provided via SaaS functionality.

In some embodiments, the generated subscription causes a data structure to be modified and/or created related to the user's account, and stored. The storage can be in storage 506, which enables the user access to the applications and programs associated with their subscription.

In Step 612, usage of the programs provided to the user are monitored. The monitoring can involve analyzing the user data, program data, usage data, and the like, related to the user (and its sub-users) usage of the programs provided by engine 400. Such analysis can be performed in a similar manner as discussed above in relation to Step 604, and the data usage can be compared to a threshold whereby satisfaction of the threshold indicates a properly subscribed user.

In some embodiments, such monitoring can be performed in response to a request, periodically (according to a predetermined time period), or upon certain detection of events (e.g., error messages, identification of anomalies, or excess network usage, and the like). Step 612's monitoring ensures that the core operations, as mentioned above, are maintained, and that the programs are meeting the subscription needs of the user (identified in Step 602's request and/or determined in Step 604, as discussed above). For example, whether more or less programs are required, and/or whether programs need updating, maintenance, and the like.

In Step 614, a determination is made whether the user's subscription requires an adjustment, which is based on the monitoring and analysis of Step 612.

Some embodiments involve engine 400 determining, among other determinations, whether the capabilities of the programs subscribed to are adequate for the user, whether the user is in need of less or more programs (e.g., paying for too much or needs to upgrade their subscription), whether the rights and privileges are being acknowledged and followed, and the like.

In Step 616, the subscription can be adjusted based on the determination of Step 614. After adjustment, Process 600 reverts back to Step 612 to continue monitoring usage according to the adjusted subscription terms.

In some embodiments, the adjustment can include, but is not limited to, pricing, term, increase/decrease of rights/privileges related to applications and/or data, licenses and/or sub-licenses being given or revoked, alternative programs, updated programs, network throttling, more bandwidth, and the like. For example, it may be determined that a user's company initially had contracted to perform a job that required 1,000 accounts; however, it is now 2,000 accounts, therefore, the subscription would have to be adjusted, as well as the term and pricing to meeting the current needs of the user. In some embodiments, only a portion of an existing subscription can be modified; in some embodiments, an entire subscription may be modified; and in some embodiments, an entire new subscription may be provided, thereby voiding and/or deleting the previous (or initial) prescription information and allotment for the user (e.g., the data structure and replaying with a new one, for example).

In some embodiments, the adjustment causes the data structure for the user's account (e.g., from Step 610) to be modified according to the adjusted subscription terms.

Any of the operations described herein that form part of the disclosure are useful machine operations. The disclosure also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

Some embodiments can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the disclosure are set forth in the following claims.

What is claimed is:

1. A method comprising:
    receiving, by a device, a request for a subscription for a user, the subscription comprising software-as-a-service (SaaS) access to applications over a network;
    analyzing, by the device, the request, and determining subscription information, the subscription information comprising a type and quantity of the SaaS applications and term of use of the SaaS applications over the network;
    compiling, by the device, an electronic message, the electronic message comprising the subscription information;
    communicating, by the device, over the network, the electronic message to an account of the user;
    receiving, by the device, input related to the subscription information included in the electronic message;
    generating, by the device, a SaaS subscription for the user, the SaaS subscription enabling access to at least a portion of the SaaS applications referenced in the electronic message based on the input and the term of use;
    monitoring and analyzing usage of the SaaS subscription;
    determining, based on the analysis of the usage, whether the SaaS subscription requires an adjustment;
    adjusting the SaaS subscription based on the determination, the adjustment causing a modification to at least one of a term, type and usage of SaaS applications available to the user over the network.

2. The method of claim 1, wherein the generated SaaS subscription affords the account of the user access to at least one of program files and selected products provided by an entity associated with the device, wherein the access is enabled over the network.

3. The method of claim 2, further comprising:
    creating a subscription data structure related to the generated SaaS subscription;
    storing the subscription data structure in accordance with the user account, wherein the user access to the SaaS subscription is enabled via the subscription data structure.

4. The method of claim 1, wherein the usage of the SaaS subscription corresponds to data related to at least one of detection of an event, identification of an anomaly, program usage data and excess network usage.

5. The method of claim 1, wherein the adjustment of the SaaS subscription comprises enabling access to more programs and files over the network.

6. The method of claim 1, wherein the adjustment of the SaaS subscription comprises reducing access to programs and files over the network.

7. The method of claim 1, wherein the input corresponds to a selection of a set of programs and files accessible via the determined subscription information.

8. The method of claim 1, wherein the subscription information further comprises read and write rights for the SaaS applications.

9. The method of claim 1, wherein the user is a company, wherein the SaaS subscription enables at least some of the company's users access to programs and files associated with the SaaS subscription.

10. The method of claim 1, wherein the SaaS applications are accessible via a cloud system associated with a service provider.

11. A device comprising:
a processor configured to:
- receive a request for a subscription for a user, the subscription comprising software-as-a-service (SaaS) access to applications over a network;
- analyze the request, and determine subscription information, the subscription information comprising a type and quantity of the SaaS applications and term of use of the SaaS applications over the network;
- compile an electronic message, the electronic message comprising the subscription information;
- communicate, over the network, the electronic message to an account of the user;
- receive input related to the subscription information included in the electronic message;
- generate a SaaS subscription for the user, the SaaS subscription enabling access to at least a portion of the SaaS applications referenced in the electronic message based on the input and the term of use;
- monitor and analyze usage of the SaaS subscription;
- determine, based on the analysis of the usage, whether the SaaS subscription requires an adjustment; and
- adjust the SaaS subscription based on the determination, the adjustment causing a modification to at least one of a term, type and usage of SaaS applications available to the user over the network.

12. The device of claim 11, wherein the generated SaaS subscription affords the account of the user access to at least one of program files and selected products provided by an entity associated with the device, wherein the access is enabled over the network.

13. The device of claim 12, wherein the processor is further configured to:
- create a subscription data structure related to the generated SaaS subscription; and
- store the subscription data structure in accordance with the user account, wherein the user access to the SaaS subscription is enabled via the subscription data structure.

14. The device of claim 11, wherein the usage of the SaaS subscription corresponds to data related to at least one of detection of an event, identification of an anomaly, program usage data and excess network usage.

15. The device of claim 11, wherein the adjustment of the SaaS subscription comprises at least one of enabling access to more programs and files over the network, and reducing access to programs and files over the network.

16. The device of claim 11, wherein the input corresponds to a selection of a set of programs and files accessible via the determined subscription information.

* * * * *